US012701392B2

(12) United States Patent
Huang et al.

(10) Patent No.: US 12,701,392 B2
(45) Date of Patent: Aug. 4, 2026

(54) EARPHONE COMMUNICATION METHOD, EARPHONE DEVICE AND COMPUTER-READABLE STORAGE MEDIUM

(71) Applicant: GOERTEK TECHNOLOGY CO., LTD., Qingdao (CN)

(72) Inventors: Chen Huang, Qingdao (CN); Zhongzhen Wang, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 298 days.

(21) Appl. No.: 18/426,514

(22) Filed: Jan. 30, 2024

(65) Prior Publication Data

US 2024/0171953 A1 May 23, 2024

Related U.S. Application Data

(63) Continuation of application No. PCT/CN2021/138957, filed on Dec. 17, 2021.

(30) Foreign Application Priority Data

Aug. 30, 2021 (CN) ......................... 202111007733.4

(51) Int. Cl.
*H04W 4/80* (2018.01)
*H04R 1/10* (2006.01)
*H04W 4/16* (2009.01)

(52) U.S. Cl.
CPC ............ *H04W 4/80* (2018.02); *H04R 1/1083* (2013.01); *H04W 4/16* (2013.01); *H04R 2460/01* (2013.01)

(58) Field of Classification Search
CPC ........ H04W 4/80; H04W 4/16; H04R 1/1083; H04R 2460/01
See application file for complete search history.

(56) References Cited

U.S. PATENT DOCUMENTS

2020/0349933 A1 11/2020 Wolff et al.
2021/0368255 A1* 11/2021 Lee ........................ H04R 1/105
(Continued)

FOREIGN PATENT DOCUMENTS

CN 105814913 A 7/2016
CN 107564523 A 1/2018
(Continued)

OTHER PUBLICATIONS

First Office Action in Corresponding Chinese Application No. 202111007733.4, dated Nov. 9, 2023; 18 pgs.
(Continued)

*Primary Examiner* — John J Lee
(74) *Attorney, Agent, or Firm* — HAUPTMAN HAM, LLP

(57) ABSTRACT

Disclosed are an earphone communication method, an earphone device, and a computer-readable storage medium. The method includes: when a conversation requirement of a first user is detected, detecting target devices within a preset range around a first earphone device; sending a conversation request to each target device, so that each target device determines whether to accept the conversation request; establishing a voice communication connection with a second earphone device in each target device that determines acceptance of the conversation request; and under the voice communication connection, performing noise reduction on voice data picked up by a microphone in the first earphone device and then sending the voice data to the second earphone device, so that the second earphone device outputs the received voice data.

8 Claims, 2 Drawing Sheets

(56) References Cited

U.S. PATENT DOCUMENTS

| | | | | |
|---|---|---|---|---|
| 2023/0022327 | A1* | 1/2023 | Chen | H04R 1/1016 |
| 2023/0074888 | A1* | 3/2023 | Liu | H04R 1/10 |

FOREIGN PATENT DOCUMENTS

| | | | |
|---|---|---|---|
| CN | 110660406 | A | 1/2020 |
| CN | 111464905 | A | 7/2020 |
| CN | 112751582 | A | 5/2021 |
| CN | 112770214 | A | 5/2021 |
| CN | 113596670 | A | 11/2021 |
| CN | 113727318 | A | 11/2021 |
| EP | 1887770 | A1 | 2/2008 |
| TW | M502296 | U | 6/2015 |

OTHER PUBLICATIONS

International Search Report and Written Opinion in Corresponding International Application No. PCT/CN2021/138957, mailed May 25, 2022; 15 pgs.

* cited by examiner

EARPHONE COMMUNICATION METHOD, EARPHONE DEVICE AND COMPUTER-READABLE STORAGE MEDIUM

CROSS-REFERENCE TO RELATED APPLICATIONS

The present application is a continuation application of International Application No. PCT/CN2021/138957, filed on Dec. 17, 2021, which claims priority to Chinese Patent Application No. 202111007733.4, filed on Aug. 30, 2021. The disclosures of the above-mentioned applications are incorporated herein by reference in their entireties.

TECHNICAL FIELD

The present application relates to the technical field of earphones, in particular to an earphone communication method, an earphone device, and a computer-readable storage medium.

BACKGROUND

Being in a noisy environment for a long time will cause damage to human health. The state stipulates that workplaces with noise exceeding 80 db are noise jobs, and operators should wear earplugs. However, there is also a need to talk in a noisy environment. At this time, people often use a louder voice to talk. In a noisy scene, it may be difficult to hear clearly even with a louder voice. Therefore, there is an urgent need to provide a solution that enables people to hear each other's voice clearly in a noisy environment.

SUMMARY

The main purpose of the present application is to provide an earphone communication method, an earphone device, and a computer-readable storage medium, aiming to provide a solution that enables people to hear each other's voice clearly even in a noisy environment.

To achieve the above purpose, the present application provides an earphone communication method, applied to a first earphone device of a first user, including:

detecting target devices within a preset range around the first earphone device in response to detecting a conversation requirement of the first user;

sending a conversation request to each of the target devices, and determining whether to accept the conversation request by each of the target devices;

establishing a voice communication connection with a second earphone device that determines acceptance of the conversation request among each of the target devices; and sending voice data picked up by a microphone in the first earphone device to the second earphone device after noise reduction under the voice communication connection, so that the second earphone device is configured to output the received voice data.

In an embodiment, the detecting the target devices within the preset range around the first earphone device includes:

determining a line-of-sight angle range of the first user by posture information of the first earphone device; and scanning devices around the first earphone device by way of short-distance wireless communication, and configuring devices within the line-of-sight angle range among the scanned devices as target devices.

In an embodiment, before the detecting target devices within a preset range around the first earphone device in response to detecting a conversation requirement of the first user, the method further includes:

detecting whether a voiceprint picked up by the microphone in the first earphone device matches the voiceprint of the first user;

in response to that the voiceprint picked up by the microphone in the first earphone device matches the voiceprint of the first user, picking up an user voice of the first user through the microphone, and detecting whether a voice content of the user voice includes keywords in the preset owner keyword table; and in response to that the voice content of the user voice includes keywords in the preset owner keyword table, determining that the conversation request of the first user is detected.

In an embodiment, the sending the conversation request to each of the target devices, and determining whether to accept the conversation request by each of the target devices includes:

sending the conversation request to each of the target devices; the user voice is carried by the conversation request, so that the target device is configured to detect whether the keywords in the user voice are consistent with the preset owner keyword, and determine acceptance of the conversation request in response to consistency.

In an embodiment, the earphone communication method further includes:

receiving and playing the voice data sent by the second earphone device through a speaker of the first earphone device under the voice communication connection.

In an embodiment, after the sending the voice data picked up by the microphone in the first earphone device to the second earphone device after noise reduction under the voice communication connection, the method further includes:

under the voice communication connection, disconnecting the voice communication connection with the second earphone device in response to that an instruction to end a conversation triggered by the first earphone device is detected; or, under the voice communication connection, disconnecting the voice communication connection with the second earphone device in response to that the first earphone device is continuously in a target state for a preset duration; the target state is a state in which the microphone in the first earphone device does not pick up the voice data, and the first earphone device does not receive the voice data sent by the second earphone device.

To achieve the above purpose, the present application provides an earphone communication method, applied to a second earphone device of a second user, including:

receiving a conversation request sent by a first earphone device; the first earphone device is configured to send the conversation request to target devices within a preset range around the first earphone device in response to that the conversation request of an owner user is detected;

determining whether to accept the conversation request;

establishing a voice communication connection with the first earphone device in response to that the conversation request is determined to be accepted; and receiving voice data sent by the first earphone device and playing through a speaker in the second earphone device under the voice communication connection; the first earphone device is configured to send the voice data picked up by the microphone to the second earphone device after noise reduction processing.

In an embodiment, the determining whether to accept the conversation request includes:

detecting whether a do-not-disturb mode is enabled;

in response to that the do-not-disturb mode is enabled, determining that the conversation request is not accepted;

in response to that the do-not-disturb mode is not enabled, detecting whether keywords contained in a voice content of an user voice in the conversation request are consistent with preset owner keywords corresponding to the second user;

in response to that the keywords contained in the voice content of the user voice in the conversation request are consistent with the preset owner keywords corresponding to the second user, determining that the conversation request is accepted; and in response to that the keywords contained in the voice content of the user voice in the conversation request are not consistent with the preset owner keywords corresponding to the second user, determining that the conversation request is not accepted.

To achieve the above purpose, the present application provides an earphone communication device, the device is provided on the first earphone device of the first user, including:

a detection module, configured to detect a target device within a preset range around the first earphone device in response to that the first user's need for conversation is detected;

a first sending module, configured to send a conversation request to each of the target devices, so that each of the target devices can determine whether to accept the conversation request;

an establishment module, configured to establish a voice communication connection with a second earphone device in each of the target devices that determines acceptance of the conversation request; and a second sending module, configured to send the voice data picked up by the microphone in the first earphone device to the second earphone device after noise reduction processing under the voice communication connection, so as to output the received voice data by the second earphone device.

To achieve the above purpose, the present application provides an earphone communication device, the device is provided on the second earphone device of the second user, including:

a first receiving module, configured to receive the conversation request sent by the first earphone device; in response to detecting the conversation requirement of the owner user, the first earphone device sends the conversation request to the target devices within the preset range around the first earphone device;

a determination module, configured to determine whether to accept the conversation request;

an establishment module, configured to establish a voice communication connection with the first earphone device in response to that the conversation request is determined to be accepted; and a second receiving module, configured to receive the voice data sent by the first earphone device under the voice communication connection and play it through the speaker in the second earphone device; the first earphone device sends the voice data picked up by the microphone to the second earphone device after noise reduction processing.

To achieve the above purpose, the present application provides an earphone device, including: a memory, a processor, and an earphone communication program stored on the memory and operable on the processor; when the earphone communication program is executed by the processor, the steps of the earphone communication method are realized.

To achieve the above purpose, the present application provides a computer-readable storage medium on which an earphone communication program is stored; when the earphone communication program is executed by a processor, the steps of the earphone communication method are realized.

In the present application, when the first earphone device detects the first user's need for conversation, the target devices are detected within the preset range around the first earphone device; the first earphone device sends a conversation request to the target devices, and establishes a voice communication connection with a second earphone device determined to accept the conversation request in the target devices; and under the voice communication connection, the voice data picked up by the microphone is sent to the second earphone device after noise reduction, and is output to the user of the second earphone device to hear, so that the user of the second earphone device can clearly hear the voice of the first user even in a noisy environment.

The realization, functional features and advantages of the present application will be further described in conjunction with the embodiments and with reference to the accompanying drawings.

DETAILED DESCRIPTION OF THE EMBODIMENTS

It should be understood that the specific embodiments described herein are only used to explain the present application, and are not intended to limit the present application.

Figure 1:
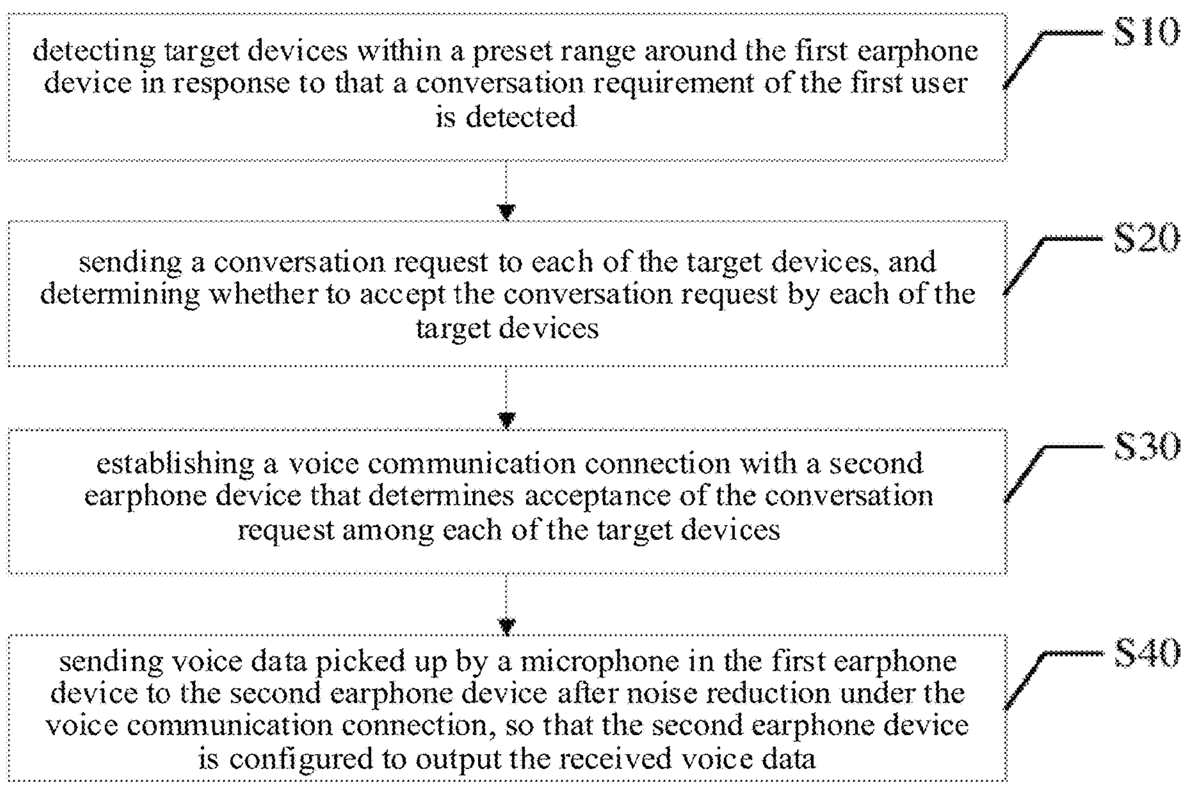
FIG. 1 is a schematic flowchart of an earphone communication method according to a first embodiment of the present application.

Referring to FIG. 1, FIG. 1 is a schematic flowchart of an earphone communication method according to a first embodiment of the present application.

The embodiment of the present application provides an embodiment of the earphone communication method. It should be noted that although the logic sequence is shown in the flowchart, in some cases, a step of the sequence shown or described can be executed in a sequence different from that shown here. In this embodiment, the earphone communication method is applied to an earphone device (hereinafter referred to as a first earphone device for distinction). In this embodiment, the earphone communication method includes:

Step S10, detecting target devices within a preset range around the first earphone device in response to detecting a conversation requirement of the first user.

The user who uses the first earphone device is referred to as the first user for distinction. The first earphone device can detect the first user's need for conversation, that is, detect whether the first user has a need for conversation. It should be noted that, when the first earphone device includes two earphones, a controller in one of the earphones may perform the following steps of the detecting step.

There are many ways for the first earphone device to detect the first user's need for conversation. In an embodiment, when the microphone or the bone voiceprint sensor in the first earphone device detects that the first user is speaking, and the content of the speaking includes preset specific content, it is determined that the first user needs to talk. When detecting whether the first user is speaking through the microphone, it may be determined that the first user is speaking when it is detected that the sound signal picked up by the microphone is a voice signal; when detecting whether the first user is speaking through the bone voiceprint sensor, it is determined that the first user is speaking when the sensor detects the sound signal. The preset specific content may be a preset wake-up sentence. When the first earphone device detects that the first user is speaking, it compares the voice data picked up by the microphone with the voice corresponding to the wake-up sentence, or compares the voice data, after converted into the text, with the wake-up sentence. If the comparison is consistent, it is determined that the first user has a need for conversation, that is, it is determined that the first user's need for conversation has been detected. In another embodiment, it is also possible to set a physical or virtual button in the first earphone device for the user to trigger a conversation instruction through the button when there is a need for conversation. The first earphone device detects the conversation instruction, that is, the first user's need for conversation is detected. In another embodiment, the first user may also trigger a conversation instruction through a user terminal connected to the first earphone device, and when the first earphone device receives the conversation instruction sent by the user terminal, it is determined that the conversation requirement of the first user is detected.

When the first earphone device detects the first user's need for conversation, it detects devices around the first earphone device, and takes devices within a preset range around the first earphone device as target devices. The preset range can be set as required, for example, it can be set as a circular range with the first earphone device as the center and a certain distance as the radius, so as to limit the sending target of the conversation request to the device closer to the first earphone device; another example can be set to a certain line-of-sight angle range, so as to limit the sending target of the conversation request to the device within the range facing the first user. The first earphone device may locate the distance between the scanned device and the first earphone device or the angle relative to the first earphone device by means of short-distance positioning.

Step S20, sending a conversation request to each of the target devices, and determining whether to accept the conversation request by each of the target devices.

After determining the target device, the first earphone device sends a conversation request to the target device. The conversation request can carry information indicating that a voice communication connection with the target device is to be established, so that the target device can determine whether to accept the conversation request after receiving and recognizing the conversation request. Specifically, there are many ways for the target device to determine whether to accept the conversation request, which are not limited in this embodiment. For example, in one embodiment, after receiving the conversation request, the target device can output prompt information or prompt sound to prompt the user whether to accept the conversation request; the output prompt information can be output to the display screen of the target device or the display screen of other devices communicated with the target device. If the target device is also an earphone device, it can be output to the display screen of the user terminal connected to the target device; the output prompt tone can be output to the speaker of the target device to play or output to communicate with the target device speakers of other connected devices. After the target device outputs the prompt information or prompt sound, it detects whether the feedback information triggered by the user is received. The target device is set with virtual or physical buttons for the user to operate, and the user triggers the feedback information of acceptance or non-acceptance through the virtual or physical buttons; or, when the target device is an earphone device, virtual or physical buttons for user operation may be set in the user terminal connected to the earphone device, and the user triggers the feedback information of acceptance or non-acceptance through the virtual or physical buttons, and the user terminal feeds the feedback information to earphone device. When the target device receives the feedback information of accepting the conversation request, it determines to accept the conversation request; and when it receives the feedback information of not accepting the conversation request or does not receive the feedback information within a period of time, it determines not to accept the conversation request. It should be noted that the target device that does not process the conversation request can be regarded as a device that does not accept the conversation request.

Step S30, establishing a voice communication connection with a second earphone device that determines acceptance of the conversation request among each of the target devices;

The earphone device in the target device that accepts the conversation request is called the second earphone device for distinction, and the first earphone device establishes a voice communication connection with the second earphone device. The voice communication connection may be a connection established by means of short-distance wireless communication, such as Bluetooth, Wireless Fidelity (WiFi), Near Field Communication (NFC), for transmitting voice data between the first earphone device and the second earphone device.

In one embodiment, the second earphone device may actively initiate a voice communication connection request to the first earphone device after determining acceptance of the conversation request, and the first earphone device establishes a voice communication connection with the second earphone device after receiving the voice communication connection request. In another embodiment, the second earphone device may feed back a feedback message of accepting the conversation request to the first earphone device after determining acceptance of the conversation request; and after receiving the feedback message sent by the second earphone device, the first earphone device initiates a voice communication connection request to the second earphone device; and after receiving the voice communication connection request, the second earphone device establishes a voice communication connection with the first earphone device; when the target device determines that it does not accept the conversation request, it can feed back a message to the first earphone that it does not accept the feedback message of the conversation request; or it does not feed back any message. When the first earphone device receives the feedback message of not accepting the conversation request sent by the target device or does not receive the feedback message sent by the target device within a certain period of time, it will not send a voice communication connection request to the target device.

Step S40, sending voice data picked up by a microphone in the first earphone device to the second earphone device after noise reduction under the voice communication connection, so that the second earphone device is configured to output the received voice data.

When the first earphone device and the second earphone device are in the voice communication connection state, the voice data picked up by the first earphone device through the microphone in the first earphone device can be sent to the second earphone device after noise reduction. The noise reduction may adopt a commonly used uplink noise reduction method, which will not be described in detail here. The voice data after noise reduction is sent to the second earphone device, and the second earphone device plays the voice data through the loudspeaker, so that the user of the second earphone device can hear the speech of the first user through the second earphone device; and the voice data is processed by the noise reduction and is played through the second earphone device, so compared to directly listening to the first user's voice in a noisy environment, the user of the second earphone device can clearly listen to the first user's voice through the second earphone device.

In this embodiment, when the first earphone device detects the first user's need for conversation, it detects the target device within the preset range around the first earphone device, sends a conversation request to the target device, and establishes a voice communication connection with the second earphone device that determines to accept the conversation request in the target device, sends the voice data picked up by the microphone to the second earphone device after noise reduction under the voice communication connection, and outputs it to the user of the second earphone device to listen, so that the user of the second earphone device can clearly hear the voice of the first user even in a noisy environment.

Further, in one embodiment, the method also includes:

Step S50, under the voice communication connection, receiving and playing the voice data sent by the second earphone device through the speaker of the first earphone device.

Under the voice communication connection, in order to enable the first user to clearly hear the voice of the user of the second earphone device, the second earphone device can pick up the voice data of the user of the second earphone device through the microphone in the second earphone device, which is sent to the first earphone device after noise reduction. After receiving the voice data sent by the second earphone device, the first earphone device plays the voice data through the speaker of the first earphone device for the first user to listen to. This embodiment realizes that the earphone wearer can have a face-to-face conversation through the communication between the earphones, so that the talker can also have a normal conversation in a noisy scene.

Further, the method also includes:

Step S60, under the voice communication connection, disconnecting the voice communication connection with the second earphone device in response to that an instruction to end the conversation triggered by the first earphone device is detected.

In an embodiment, the first earphone device may be provided with a physical button or a virtual button for the user to operate, and the user may trigger the instruction to end the conversation through the button, or the end of the conversation instruction may also be a voice instruction triggered by the user's voice. Under the voice communication connection with the second earphone device, when the first earphone device detects the instruction to end the conversation, the voice communication connection is disconnected with the second earphone device. Similarly, the second earphone device can also be provided with a physical button or a virtual button for the user to operate. When the second earphone device detects the instruction to end the conversation triggered by a button, or end-talk instruction triggered by the user voice, the connection with the first earphone device is disconnected.

Step S70, under the voice communication connection, disconnecting the voice communication connection with the second earphone device in response to that it is detected that the first earphone device is continuously in the target state for a preset duration; the target state is a state in which the microphone in the first earphone device does not pick up voice data, and the first earphone device does not receive the voice data sent by the second earphone device.

Or, under the voice communication connection with the second earphone device, the first earphone device can count when it is in the target state, and detect whether the duration of the first earphone device being in the target state continuously reaches the preset duration, and if the preset duration is reached, the voice communication connection with the second earphone device is disconnected. The target state is a state in which the microphone in the first earphone device does not pick up voice data and the first earphone device does not receive the voice data sent by the second earphone device. Similarly, the second earphone device can also disconnect the voice communication connection with the first earphone device when it detects that it is continuously in the target state for a preset duration; the target state of the second earphone device is a state in which the microphone in the second earphone device does not pick up voice data and the second earphone device does not receive the voice data sent by the first earphone device.

Further, based on the first embodiment above, a second embodiment of the earphone communication method of the present application is provided. In this embodiment, the step S10 includes:

Step S101, determining the line-of-sight angle range of the first user through the posture information of the first earphone device.

In this embodiment, a positive line-of-sight direction on the horizontal reference plane can be determined according to the posture information of the first earphone device, and after the positive line-of-sight direction is rotated by a preset angle counterclockwise and clockwise respectively, the angle range limited by the two directions is the line-of-sight angle range of the first user. The preset angle can be set in advance according to needs, for example, it can be set to 60 degrees, then, when the positive direction of the line-of-sight is taken as the positive direction of the x-axis, the line-of-sight angle range is [−60, 60]. There are many methods for determining the normal line-of-sight according to the posture information of the first earphone device. For example, in one embodiment, the first earphone device may include two earphones, and the normal line-of-sight direction may be determined based on the posture information of the two earphones. It is also possible to use the posture information of an earphone to determine the direct line-of-sight. The posture information of the two earphones is used to determine the positive direction of the line-of-sight. Specifically, the relative position of the two earphones can be used as the posture information. The two earphones can determine the relative position through short-di stance wireless communication. The projection direction of the direction from a left earphone to a right earphone on the horizontal reference plane is the positive direction of the x-axis, and the positive direction of the x-axis is rotated 90 degrees counterclockwise as the positive direction of the line-of-sight. Then, assuming that the preset angle is 60 degrees, the line-of-sight angle range is [30, 150]. The positive direction of the line-of-sight is determined by the posture information of an earphone. Specifically, the direction information collected by the direction sensor in the earphone can be used as the posture information. The left and right earphones have positive and negative sides. The side facing the user's face when the earphone is worn on the human ear is taken as the front. The positive direction of the front is marked in the reference coordinate system of the earphone in advance, and the projection direction of the positive direction collected by the direction sensor on the horizontal reference plane is used as the positive direction of sight.

Step S102, scanning devices around the first earphone device by means of short-distance wireless communication, and configuring the device within the line-of-sight angle range among the scanned devices as the target device.

The first earphone device can scan surrounding devices by means of short-distance wireless communication. The short-distance wireless communication mode can be Bluetooth, WiFi, NFC and other modes, which are not limited in this embodiment. When scanning surrounding devices via Bluetooth, you can scan surrounding LE AUDIO (Low Energy Audio, Bluetooth low energy audio) devices in order to establish a LE Audio link with the LE AUDIO device and transmit audio with low power consumption. The first earphone device takes a device within the range of the line-of-sight angle range among the scanned devices as the target device. The first earphone device may locate an angle of the scanned device relative to the first earphone device in a short-distance positioning manner, and then determine whether the angle falls within the realized angle range. The short-distance positioning manner may be a Bluetooth angle of arrival (AOA) positioning manner, or an ultra wide-band (UWB) positioning manner, etc., which are not limited in this embodiment. Specifically, in one embodiment, when using the posture information of an earphone to determine the positive direction of line-of-sight, a short-distance positioning manner can be used to locate the deviation angle of the scanned device relative to the positive direction in the earphone reference coordinate system through an earphone, and then the deviation angle is converted to the horizontal reference plane to obtain the deviation angle relative to the positive direction of the line-of-sight, and whether the deviation angle falls within the range of the line-of-sight angle is judged. In another embodiment, when using the posture information of the two earphones to determine the positive direction of the line-of-sight, the distance between the scanned device and the earphone can be respectively positioned through the two earphones using a short-distance positioning manner. By combining the distance between the two earphones and using the principle of triangulation, the deviation angle of the device relative to the positive direction of the line-of-sight can be calculated, and whether the deviation angle falls within the range of the line-of-sight angle can be judged.

In this embodiment, the first user's line-of-sight angle range is determined through the posture information of the first earphone device, devices around the first earphone device are scanned through short-distance wireless communication, and the devices within the line-of-sight angle range in the scanned devices are used as the target device, so that the first earphone device can more accurately locate the object that the first user wants to talk to, and accurately establish a voice communication connection with the device of the conversation object.

Further, based on the above-mentioned first and/or second embodiments, a third embodiment of the earphone communication method of the present application is provided. In this embodiment, before the step S10, it also includes:

Step A10, detecting whether the voiceprint picked up by the microphone in the first earphone device matches the voiceprint of the first user.

Step A20, if the voiceprint picked up by the microphone in the first earphone device matches the voiceprint of the first user, picking up the user voice of the first user through the microphone, and detecting whether the voice content of the user voice contains keywords in the preset owner keyword table.

In this embodiment, when the first earphone device detects that the first user is speaking, the microphone in the first earphone device can pick up the user's voice of the first user, and detect whether the voice content of the user's voice contains keywords in the preset owner keyword table. The preset owner keyword table can be a keyword table entered in advance in the first earphone device, and the keyword can be a person's name, or a nickname, or some user-specific conversation words. Or, the list of names is obtained from the directory of the user terminal, the list of names is used as a keyword list, and the list of names can include at least one name. Detecting whether the voice content of the user's voice contains keywords may be to recognize the user's voice as text, and the text is compared with the keywords in the keyword table to determine whether there is content consistent with the keywords in the keyword table. It is noted that when the text contains at least one keyword, it is determined that the voice content of the user's voice contains keywords in the preset owner keyword table. Detecting whether the voice content of the user's voice contains a keyword can also be to compare the user's voice with the voice of the keyword entered in advance or the voice of the synthesized keyword. If the voice of at least one keyword matches the voice of the user, then it is determined that the voice content of the user's voice contains keywords in the preset owner keyword table.

Furthermore, in one embodiment, different keyword tables corresponding to different locations can be preset in the first earphone device, and when the first earphone device picks up the user voice of the first user through the microphone, it can detect the current location. The keyword list corresponding to the current location is selected and compared with the user voice to detect whether the voice content of the user voice contains keywords in the keyword list. For example, in the location range where the first user's home is located, a keyword table including names of family members may be selected, and in a location range where the first user's company is located, a keyword table including names of company colleagues may be selected.

In this embodiment, the manner in which the first earphone device detects whether the first user is speaking may specifically be: when the microphone in the first earphone device picks up a sound signal, it may detect whether the voiceprint of the picked up sound signal is consistent with that of the first user. The voiceprint of the first user may be recorded and stored in the first earphone device in advance. The way of voiceprint matching can adopt the existing voiceprint matching algorithm, which will not be described in detail here. If the voiceprint picked up by the microphone in the first earphone device matches the voiceprint of the first user, it can be determined that the first user is speaking.

Step A30, if the voice content of the user voice contains keywords in the preset owner keyword table, determining that the first user's need for conversation is detected.

If it is detected that the voice content of the user's voice contains keywords in the preset owner keyword table, it means that the first user is calling other users, and at this time the first earphone device can determine that the first user's need for conversation is detected.

In this embodiment, when the first earphone device detects that the voice content of the user's voice contains keywords in the preset owner keyword table, it is determined that the first user's conversation need is detected, and a conversation request is sent to the target device, so that the first user can trigger the earphone device to establish a voice communication connection by calling out to other users, so as to realize clear communication with the other party in a noisy environment.

Further, in one embodiment, the step S20 includes:

Step S201, sending a conversation request to each of the target devices; the conversation request carries the user's voice, so that the target device can detect whether the keyword in the user's voice is consistent with the preset owner keyword, and determine acceptance of the conversation request when they are consistent.

The conversation request sent by the first earphone device to the target device may carry the user's voice, and the user's voice is the voice whose recognized voice content contains keywords in the preset owner keyword list. After the target device receives the conversation request, it can extract the user's voice in the conversation request, and detect whether the keywords in the user's voice are consistent with the preset owner keyword. The preset owner keyword can be an indicative keyword representing the owner of the target device recorded in advance in the target device, for example, the common name of the owner, which can be in text form or voice form; if it is in text form, the target device can recognize the user's voice as text and then compare the text with the owner's keyword to determine whether the text recognized by the user's voice contains the owner's keyword. If yes, it is determined that the keywords in the user's voice are consistent with the owner's keyword, otherwise it is determined to be inconsistent; if it is in the form of voice, the target device can compare the voice of the user with the voice of the owner's keyword to determine whether there is a part in the user's voice that matches the voice of the owner's keyword. If yes, it is determined that the keyword in the user's voice is consistent with the owner's keyword, otherwise it is determined that they are inconsistent. If the target device detects that the keyword in the user's voice is consistent with the keyword of the owner, it determines that the conversation request is accepted; otherwise, it determines that it does not accept the conversation request.

In this embodiment, by sending the user's voice in the conversation request to the target device, the target device determines acceptance of the conversation request when it detects that the keyword in the user's voice is consistent with the preset owner keyword, so that when the first user calls the owner of the target device, the target device can automatically establish a voice communication connection with the first earphone device of the first user, so that in a noisy environment, the first user can have a clear conversation with the owner of the target device.

Figure 2:
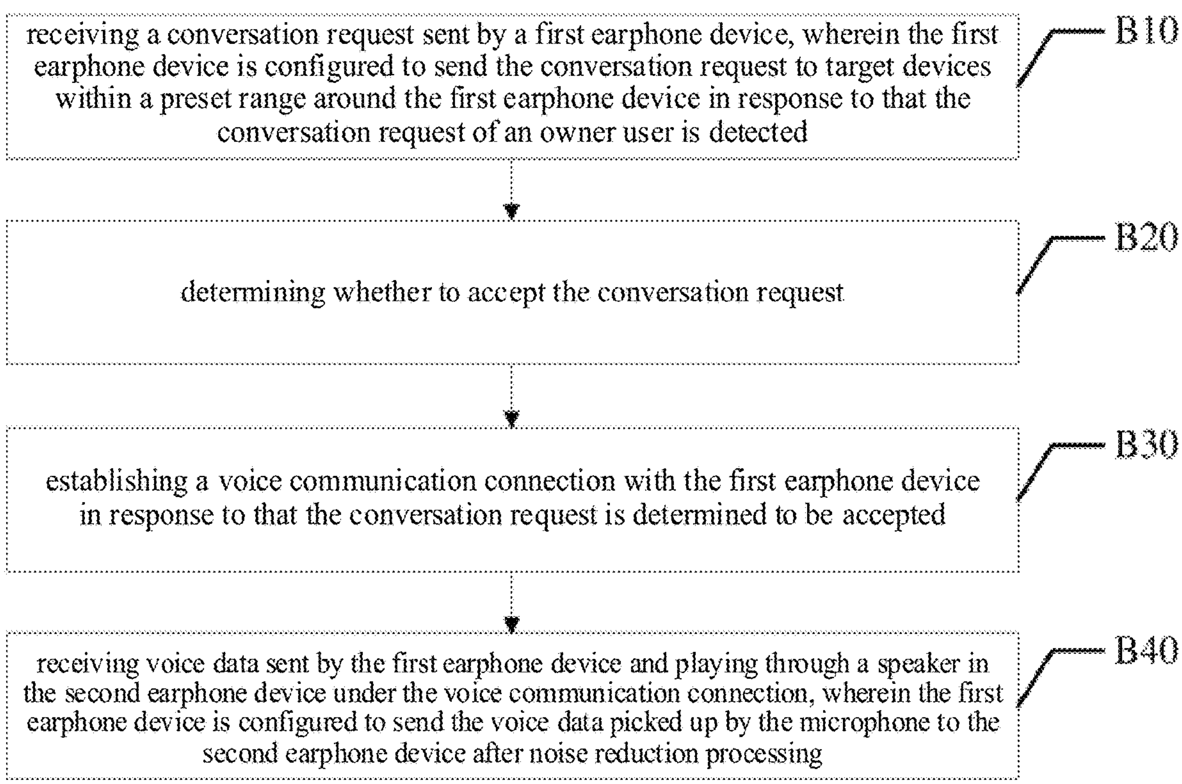
FIG. 2 is a schematic flowchart of an earphone communication method according to a fourth embodiment of the present application.

Further, based on the foregoing first, second and/or third embodiments, a fourth embodiment of the earphone communication method of the present application is provided. Referring to FIG. 2, FIG. 2 is a schematic flowchart of an earphone communication method according to a fourth embodiment of the present application. In this embodiment, the method is applied to the second earphone device of the second user, and the method includes the following steps:

Step B10, receiving a conversation request sent by the first earphone device; when the first earphone device detects a conversation request from the owner user, the first earphone device sends the conversation request to a target device within a preset range around the first earphone device;

Step B20, determining whether to accept the conversation request;

Step B30, if it is determined that the conversation request is accepted, establishing a voice communication connection with the first earphone device;

Step B40, under the voice communication connection, receiving the voice data sent by the first earphone device and playing it through the speaker in the second earphone device; the first earphone device sends the voice data picked up by the microphone to the second earphone device after noise reduction processing.

It should be noted that the second earphone device in the above embodiments refers to the earphone device in the target device that determines acceptance of the conversation request, while the second earphone device in this embodiment is equivalent to the earphone device in the target device. In this embodiment, for specific implementation manners of steps B10-B40, reference may be made to the specific implementation manners of steps S10-S40 in the foregoing embodiments, and will not be repeated here.

Further, the step B20 includes:

Step B201, detecting whether the do-not-disturb mode is enabled;

Step B202, if it is enabled, determining that the conversation request is not accepted;

Step B203, if it is not enabled, detecting whether the keyword contained in the voice content of the user's voice in the conversation request is consistent with the preset owner keyword corresponding to the second user;

Step B204, if they are consistent, determining that the conversation request is accepted;

Step B205, if they are not consistent, determining that the conversation request is not accepted.

In one embodiment, the way for the second earphone device to determine whether to accept the conversation request may specifically be: setting a do-not-disturb mode in the second earphone device, and setting a way for the user to trigger the opening or closing of the do-not-disturb mode, for example, triggers the opening or closing of the do-not-disturb mode is triggered through the virtual or physical button in the second earphone device. When the second earphone device receives the conversation request from the first earphone device, it detects whether the current do-not-disturb mode is enabled. If it is enabled, it means that the second user does not want to accept the conversation request of the first user. At this time, the second earphone device can determine that the conversation request is not accepted. If it is not enabled, the second earphone device can detect whether the keyword contained in the voice content of the user's voice in the conversation request is consistent with the second user's preset owner keyword, and the preset owner keyword can be a representative keyword representing the second user recorded in the second earphone device, for example, the common name of the second user; if they are consistent, it is determined to accept the conversation request, and if not, it is determined not to accept the conversation request. For the specific implementation manners of steps B203-B205, reference may be made to the specific implementation manners of steps A10-A30 and S201 in the above-mentioned embodiments, and will not be repeated here.

In addition, the embodiment of the present application also provides an earphone communication device, the device is provided on the first earphone device of the first user, and the device includes:

a detection module, configured to detect a target device within a preset range around the first earphone device when the first user's need for conversation is detected;

a first sending module, configured to send a conversation request to each of the target devices, so that each of the target devices can determine whether to accept the conversation request;

an establishment module, configured to establish a voice communication connection with a second earphone device in each of the target devices that determines acceptance of the conversation request;

a second sending module, configured to send the voice data picked up by the microphone in the first earphone device to the second earphone device after noise reduction processing under the voice communication connection, so as to output the received voice data by the second earphone device.

Further, the detection module is also used for:

determining the line-of-sight angle range of the first user by using the posture information of the first earphone device;

scanning the devices around the first earphone device by means of short-distance wireless communication, and configuring the devices within the line-of-sight angle range in the scanned devices as target devices.

Further, the detection module is also used for:

detecting whether the voiceprint picked up by the microphone in the first earphone device matches the voiceprint of the first user;

if the voiceprint picked up by the microphone in the first earphone device matches the voiceprint of the first user, picking up the user voice of the first user through the microphone, and detecting whether the voice content of the user voice includes keywords in the preset owner keyword table;

If the voice content of the user voice includes keywords in the preset owner keyword table, determining that the first user's need for conversation is detected.

Further, the first sending module is also used for:

sending a conversation request to each of the target devices; the conversation request carries the user's voice, so that the target device can detect whether the keyword in the user's voice is consistent with the preset owner keyword, and determining acceptance of the conversation request when they are consistent.

Further, the device also includes:

a playing module, configured to receive and play the voice data sent by the second earphone device through the speaker of the first earphone device under the voice communication connection.

Further, the device also includes:

a disconnection module, configured to, under the voice communication connection, disconnect the voice communication connection with the second earphone device when an instruction to end a conversation triggered by the first earphone device is detected; or, under the voice communication connection, disconnecting the voice communication connection with the second earphone device when it is detected that the first earphone device is continuously in the target state for a preset duration; the target state is a state that the microphone in the first earphone device does not pick up voice data, and the first earphone device does not receive the voice data sent by the second earphone device.

To achieve the above purpose, the present application also provides an earphone communication device, the device is provided on the second earphone device of the second user, and the device includes:

a first receiving module, configured to receive the conversation request sent by the first earphone device; when the first earphone device detects the conversation requirement of the owner user, it sends the conversation request to the target devices within the preset range around the first earphone device;

a determination module, configured to determine whether to accept the conversation request;

an establishment module, configured to establish a voice communication connection with the first earphone device if the conversation request is determined to be accepted;

a second receiving module, configured to receive the voice data sent by the first earphone device under the voice communication connection and play it through the speaker in the second earphone device; the first earphone device sends the voice data picked up by the microphone to the second earphone device after noise reduction processing.

Further, the determination module is also used for:

detecting whether the do-not-disturb mode is enabled;

if it is enabled, determining that the conversation request is not accepted;

if it is not enabled, detecting whether the keyword contained in the voice content of the user's voice in the conversation request is consistent with the preset owner keyword corresponding to the second user;

if consistent, determining that the conversation request is accepted;

If inconsistent, determining that the conversation request is not accepted.

The expanded content of the specific implementation of the earphone communication device of the present application is basically the same as the above-mentioned embodiments of the earphone communication method, and will not be repeated here.

In an embodiment, the earphone device of the present application may include one or two earphones, and the earphones include a structural casing, a communication module, a main control module, a speaker, a microphone, and a memory. The main control module can include a microprocessor, audio decoding unit, power supply and power management unit, sensors and other active or passive components required by the system (can be replaced, deleted or added according to actual functions), to achieve wireless audio receiving and playing functions. The earphone can establish a communication connection with the user terminal and other earphone devices through the communication module. When the earphone device is the first earphone device of the first user, the earphone communication program may be stored in the memory of the earphone, and the microprocessor may be used to call the earphone communication program stored in the memory, and perform the following operations:

detecting target devices within a preset range around the first earphone device when a conversation requirement of the first user is detected;

sending a conversation request to each of the target devices, for each of the target devices to determine whether to accept the conversation request;

establishing a voice communication connection with the second earphone device that determines acceptance of the conversation request among each of the target devices;

sending the voice data picked up by the microphone in the first earphone device to the second earphone device after noise reduction under the voice communication connection, so that the second earphone device outputs the received voice data.

Further, the detecting target devices within a preset range around the first earphone device includes:

determining the line-of-sight angle range of the first user by using the posture information of the first earphone device;

scanning devices around the first earphone device by means of short-distance wireless communication, and configuring the devices within the line-of-sight angle range among the scanned devices as target devices.

Further, when the first user's need for conversation is detected, before detecting the target devices within the preset range around the first earphone device, the microprocessor can also be used to call the earphone communication program stored in the memory, and perform the following operations:

detecting whether the voiceprint picked up by the microphone in the first earphone device matches the voiceprint of the first user;

if yes, then picking up the user voice of the first user through the microphone, and detecting whether the voice content of the user voice includes keywords in the preset owner keyword table;

if it contains, determining that the first user's need for conversation is detected.

Further, the sending a conversation request to each of the target devices for each of the target devices to determine whether to accept the conversation request includes:

sending a conversation request to each of the target devices; the conversation request carries the user's voice, so that the target device can detect whether the keyword in the user's voice is consistent with the preset owner keyword, and determine acceptance of the conversation request when they are consistent.

Further, the microprocessor can also be used to call the earphone communication program stored in the memory, and perform the following operations:

under the voice communication connection, receiving and playing the voice data sent by the second earphone device through the speaker of the first earphone device.

Further, under the voice communication connection, the voice data picked up by the microphone in the first earphone device is sent to the second earphone device after noise reduction, and the microprocessor can also be used to call the stored earphone communication program, and perform the following operations:

under the voice communication connection, disconnecting the voice communication connection with the second earphone device when an instruction to end the conversation based on the first earphone device is detected; or, under the voice communication connection, disconnecting the voice communication connection with the second earphone device when it is detected that the first earphone device is continuously in the target state for a preset duration; the target state is a state in which the microphone in the first earphone device does not pick up voice data, and the first earphone device does not receive the voice data sent by the second earphone device.

when the earphone device is the second earphone device of the second user, the earphone communication program may be stored in the memory of the earphone, and the microprocessor may be used to call the earphone communication program stored in the memory, and perform the following operations:

receiving a conversation request sent by the first earphone device; the first earphone device sends the conversation request to target devices within a preset range around the first earphone device when detecting a conversation requirement of the owner user;

determining whether to accept the conversation request;

if it is determined that the conversation request is accepted, a voice communication connection is established with the first earphone device;

under the voice communication connection, the voice data sent by the first earphone device is received and played through the speaker in the second earphone device; the first earphone device sends the voice data picked up by the microphone to the second earphone device after noise reduction processing.

Further, the determining whether to accept the conversation request includes:

detecting whether the do-not-disturb mode is enabled;

if it is enabled, determining that the conversation request is not accepted;

if it is not enabled, then detecting whether the keyword contained in the voice content of the user's voice in the conversation request is consistent with the preset owner keyword corresponding to the second user;

if consistent, determining that the conversation request is accepted;

if inconsistent, then determining that the conversation request is not accepted.

In addition, the embodiment of the present application also provides a computer-readable storage medium, on which an earphone communication program is stored, and when the earphone communication program is executed by a processor, the steps of the earphone communication method described below are implemented.

For the embodiments of the earphone device and the computer-readable storage medium of the present application, reference may be made to the various embodiments of the earphone communication method of the present application, which will not be repeated here.

It should be noted that, in this text, the term "comprise", "include" or any other variation thereof is intended to cover a non-exclusive inclusion such that a process, method, article or apparatus comprising a set of elements includes not only those elements, but also includes other elements not expressly listed, or elements inherent in the process, method, article, or device. Without further limitations, an element defined by the phrase "comprising a . . . " does not preclude the presence of additional identical elements in the process, method, article, or apparatus comprising that element.

The serial numbers of the above embodiments of the present application are for description only, and do not represent the advantages and disadvantages of the embodiments.

Through the description of the above embodiments, those skilled in the art can clearly understand that the methods of the above embodiments can be implemented by means of software plus a necessary general-purpose hardware platform, and of course also by hardware, but in many cases the former is better implementation. Based on such an understanding, the technical solution of the present application can be embodied in the form of a software product in essence or the part that contributes to the related art, and the computer software product is stored in a storage medium (such as ROM/RAM, disk, CD) containing several instructions to enable a terminal device (which may be a mobile phone, a computer, a server, an air conditioner, or a network device, etc.) to execute the methods described in the various embodiments of the present application.

The above are only some embodiments of the present application, and are not intended to limit the patent scope of the present application. All equivalent structures or equivalent process transformations made by using the description of the present application and the accompanying drawings, directly or indirectly used in other related technical fields, are all included in the patent scope of the present application in the same way.

What is claimed is:

1. An earphone communication method, applied to a first earphone device of a first user, comprising:

detecting target devices within a preset range around the first earphone device in response to detecting a conversation requirement of the first user;

sending a conversation request to each of the target devices, and determining whether to accept the conversation request by each of the target devices;

establishing a voice communication connection with a second earphone device that determines acceptance of the conversation request among each of the target devices; and sending voice data picked up by a microphone in the first earphone device to the second earphone device after noise reduction under the voice communication connection, so that the second earphone device is configured to output the received voice data, wherein the detecting the target devices within the preset range around the first earphone device comprises:

determining a line-of-sight angle range of the first user by posture information of the first earphone device; and scanning devices around the first earphone device by way of short-distance wireless communication, and configuring devices within the line-of-sight angle range among the scanned devices as target devices.

2. The earphone communication method according to claim 1, wherein before the detecting target devices within the preset range around the first earphone device in response to detecting the conversation requirement of the first user, the method further comprises:

detecting whether a voiceprint picked up by the microphone in the first earphone device matches the voiceprint of the first user;

in response to that the voiceprint picked up by the microphone in the first earphone device matches the voiceprint of the first user, picking up a user voice of the first user through the microphone, and detecting whether a voice content of the user voice includes keywords in the preset owner keyword table; and in response to that the voice content of the user voice includes keywords in the preset owner keyword table, determining that the conversation requirement of the first user is detected.

3. The earphone communication method according to claim 2, wherein the sending the conversation request to each of the target devices, and determining whether to accept the conversation request by each of the target devices comprises:

sending the conversation request to each of the target devices, wherein the user voice is carried by the conversation request, so that the target device is configured to detect whether the keywords in the user voice are consistent with the preset owner keyword, and determine acceptance of the conversation request in response to consistency.

4. The earphone communication method according to claim 1, further comprising:

receiving and playing the voice data sent by the second earphone device through a speaker of the first earphone device under the voice communication connection.

5. The earphone communication method according to claim 4, wherein after the sending the voice data picked up by the microphone in the first earphone device to the second earphone device after noise reduction under the voice communication connection, the method further comprises:

under the voice communication connection, disconnecting the voice communication connection with the second earphone device in response to that an instruction to end a conversation triggered by the first earphone device is detected; or, under the voice communication connection, disconnecting the voice communication connection with the second earphone device in response to that the first earphone device is continuously in a target state for a preset duration; wherein the target state is a state in which the microphone in the first earphone device does not pick up the voice data, and the first earphone device does not receive the voice data sent by the second earphone device.

6. An earphone device, comprising: a memory, a processor, and an earphone communication program stored on the memory and operable on the processor, wherein when the earphone communication program is executed by the processor, the steps of the earphone communication method according to claim 1 are realized.

7. A computer-readable storage medium on which an earphone communication program is stored, wherein, when the earphone communication program is executed by a processor, the steps of the earphone communication method according to claim 1 are realized.

8. An earphone communication method, applied to a second earphone device of a second user, comprising:

receiving a conversation request sent by a first earphone device, wherein the first earphone device is configured to send the conversation request to target devices within a preset range around the first earphone device in response to detecting the conversation request of an owner user;

determining whether to accept the conversation request;

establishing a voice communication connection with the first earphone device in response to that the conversation request is determined to be accepted; and receiving voice data sent by the first earphone device and playing through a speaker in the second earphone device under the voice communication connection, wherein the first earphone device is configured to send the voice data picked up by the microphone to the second earphone device after noise reduction processing;

wherein the determining whether to accept the conversation request comprises:

detecting whether a do-not-disturb mode is enabled;

in response to that the do-not-disturb mode is enabled, determining that the conversation request is not accepted;

in response to that the do-not-disturb mode is not enabled, detecting whether keywords contained in a voice content of a user voice in the conversation request are consistent with preset owner keywords corresponding to the second user;

in response to that the keywords contained in the voice content of the user voice in the conversation request are consistent with the preset owner keywords corresponding to the second user, determining that the conversation request is accepted; and in response to that the keywords contained in the voice content of the user voice in the conversation request are not consistent with the preset owner keywords corresponding to the second user, determining that the conversation request is not accepted.

* * * * *